(12) United States Patent
Janin et al.

(10) Patent No.: US 8,333,856 B2
(45) Date of Patent: Dec. 18, 2012

(54) METHOD FOR PRODUCING AN ASYMMETRICAL TYRE

(75) Inventors: Nicolas Janin, Riom (FR); Philippe Tramond, Saint Ours les Roches (FR)

(73) Assignees: Compagnie Generale des Etablissements Michelin, Clermont-Ferrand (FR); Michelin Recherche et Technique, S.A., Granges-Paccot (CH)

( * ) Notice: Subject to any disclaimer, the term of this patent is extended or adjusted under 35 U.S.C. 154(b) by 346 days.

(21) Appl. No.: 12/670,046

(22) PCT Filed: Jul. 21, 2008

(86) PCT No.: PCT/EP2008/059518
§ 371 (c)(1),
(2), (4) Date: Apr. 14, 2010

(87) PCT Pub. No.: WO2009/013265
PCT Pub. Date: Jan. 29, 2009

(65) Prior Publication Data
US 2010/0206460 A1    Aug. 19, 2010

(30) Foreign Application Priority Data
Jul. 23, 2007 (FR) .................................. 07 05348

(51) Int. Cl.
*B29D 30/00* (2006.01)
*B60C 15/00* (2006.01)
*B60C 15/02* (2006.01)

(52) U.S. Cl. ...................... 156/110.1; 152/455; 152/456; 152/539; 152/544; 264/501

(58) Field of Classification Search .................. 152/456; 156/110.1; 264/501
See application file for complete search history.

(56) References Cited

U.S. PATENT DOCUMENTS 4,203,481 A    5/1980    Ranik, Jr. ................ 152/330 RF
(Continued)

FOREIGN PATENT DOCUMENTS

| DE | 101 54 824 C1 | 4/2003 |
|----|---------------|--------|
| EP | 1 671 814 A1  | 6/2006 |
| JP | 2006-347320   | * 12/2006 |

(Continued)

OTHER PUBLICATIONS

Machine translation of JP 2006-347320, 2006.*

*Primary Examiner* — Justin Fischer
(74) *Attorney, Agent, or Firm* — Fitzpatrick, Cella, Harper & Scinto

(57) ABSTRACT

A method for manufacturing a tyre includes:
  assembling an unvulcanized tyre, the tyre including a crown, a first sidewall and a first bead, a second sidewall and a second bead, and a carcass reinforcement, each bead including a seat; and
  vulcanizing the unvulcanized tyre in a mould having an asymmetric configuration in order to obtain a vulcanized tyre,
wherein the mould is such that, when the tyre is placed in the mould, in any meridian section, the seat of the first bead has an angle $\beta_1$ with a rotation axis A and the seat of the second bead has an angle $\beta_2$ with the rotation axis A, such that $\beta_1 - \beta_2 \succ 3$, with the angles $\beta_1$ and $\beta_2$ being expressed in degrees, with the angles $\beta_1$ and $\beta_2$ being defined, for each bead, relative to an axis Ox and Ox' parallel to the rotation axis A oriented positively towards outside of the tyre, and with the angles $\beta_1$ and $\beta_2$ being positive when extending radially outwards.

10 Claims, 5 Drawing Sheets

U.S. PATENT DOCUMENTS

| | | | |
|---|---|---|---|
| 5,301,728 A | 4/1994 | Brown, Jr. et al. | 152/209 |
| 5,971,047 A * | 10/1999 | Drieux et al. | 152/158 |
| 2004/0065397 A1 | 4/2004 | Muhlhoff | 152/151 |
| 2004/0226642 A1 | 11/2004 | Muhlhoff | 152/454 |
| 2009/0014108 A1 | 1/2009 | Grolier et al. | 152/539 |

FOREIGN PATENT DOCUMENTS

| | | |
|---|---|---|
| WO | WO 02/057096 A1 | 7/2002 |
| WO | WO 03/010011 A1 | 2/2003 |
| WO | WO 2007/088169 A1 | 8/2007 |

* cited by examiner

METHOD FOR PRODUCING AN ASYMMETRICAL TYRE

FIELD OF THE INVENTION

The invention relates to a method for manufacturing an asymmetric tyre and to an asymmetric tyre.

TECHNOLOGICAL BACKGROUND

Vehicle suspensions often impose upon the tyres that are fitted to them notable values of camber and toe-in angles. Since most tyres have a symmetrical structure, this causes, when the tyre is rolling, an asymmetric load of the areas of contact between the tyres and the ground leading to non-uniform shapes of contact areas which can have negative consequences for certain aspects of performance such as wear and behaviour.

To solve this problem in the case of a self-supporting tyre, document EP 1 671 814 proposes a method for manufacturing an asymmetric tyre. This method comprises a step of assembling an unvulcanized tyre, the tyre comprising a crown, a first sidewall and a first bead, a second sidewall and a second bead, and a carcass reinforcement, each bead comprising a seat and a step of vulcanizing the unvulcanized tyre in a mould having an asymmetric configuration in order to obtain a vulcanized tyre. This method is such that the vulcanized tyre has a tread on either side of the equatorial plane of the tyre with different radii of curvature and different thicknesses.

Document EP 1 414 655 B1 describes an asymmetric tyre designed to be mounted on a symmetric rim in which each sidewall comprises an additional inextensible ring and in which the angles of inclination of the carcass reinforcement relative to the rotation axis of the tyre are different on both sides.

The present invention proposes other methods for obtaining an asymmetry sought in a vulcanized tyre.

SUMMARY OF THE INVENTION

The method for manufacturing a tyre according to the invention, similar to the method of document EP 1 671 814, is characterized in that it uses a vulcanizing mould such that, when the unvulcanized tyre is placed in the mould, in any meridian section, the seat of the first bead having an angle $\beta_1$ with the rotation axis and the seat of the second bead having an angle $\beta_2$ with the rotation axis, this gives: $\beta_1 - \beta_2 \succ 3$; $\beta_1$ and $\beta_2$ being expressed in degrees; and the angles being defined, for each bead, relative to an axis Ox (respectively Ox') parallel to the rotation axis A oriented positively towards the outside of the tyre and the angles being positive when they extend radially outwards.

The tyre is moulded in this way in a mould the geometry of which is adapted so that the first bead seat of the tyre has a greater angle of inclination than that of the second seat.

This moulding in an asymmetric mould causes an asymmetry of the vulcanized tyre. This asymmetry is notably visible when the tyre is mounted and inflated on a working rim the two seats of which have the same angle of inclination relative to the rotation axis of the tyre: the carcass reinforcements do not have the same angle of inclination relative to the rotation axis. The angle of inclination is smaller on the side of the first bead which has been moulded with a greater angle $\beta_1$.

Consequently, the mid-plane of the crown for this tyre is offset on the side of the first bead relative to the mid-plane of the beads.

The method according to the invention has the advantage of making it easy to adjust the asymmetry of inclination of the carcass reinforcements and of the sidewalls. This makes it possible to very notably modify the parameters of geometry and of style of the tyre, but also to modify the cornering thrust and consequently the behaviour of the tyre on a vehicle.

Advantageously, the angles of inclination are such that $\beta_1 - \beta_2 \succ 10$.

Advantageously, when the unvulcanized tyre is placed in the mould, in any meridian section, the carcass reinforcement having a first point of inflection placed at the first sidewall or at the first bead and a second point of inflection placed at the second sidewall or at the second bead, the tangents at the point of inflection of the carcass reinforcement make substantially identical angles $\alpha_1$ and $\alpha_2$ with the rotation axis.

According to an additional aspect, the method according to the invention uses a vulcanizing mould such that, when the unvulcanized tyre is placed in the mould, in any meridian section, the tangents (T1, T2) at the point of inflection of the carcass reinforcement make angles $\alpha_1$ and $\alpha_2$ with the rotation axis such that: $\alpha_1 - \alpha_2 \prec 0$.

Such an asymmetry of inclination of the carcass reinforcements in the vulcanizing mould can be easily obtained by bringing the moulding elements of the first bead towards the mid-plane of the crown of the mould. Or alternatively, by moving the moulding elements of the second bead away from the mid-plane of the crown of the mould.

Advantageously, this gives: $\alpha_1 - \alpha_2 \prec -10$ and even $-35 \prec \alpha_1 - \alpha_2 \prec -10$.

When the difference of angulation reaches 35 degrees, it becomes difficult to correctly mould the first bead because the angle of rotation imposed on this first bead between its assembly on a building drum and its position in the vulcanizing mould becomes too great.

Preferably, the crown and the portions of the sidewalls adjacent to the crown of the tyre are placed symmetrically relative to the mid-plane of the crown of the tyre in the mould; and the portions of the sidewalls adjacent to the crown placed symmetrically can extend to the equator of the tyre in the mould.

This method applies for any type of anchoring of the carcass reinforcement in the two beads and notably when this anchoring comprises no upturn as in the U.S. Pat. No. 6,926,054. In this case, the carcass reinforcement has a point of inflection placed in the sidewall.

This method is also notably easier to apply and less costly than the means described in document EP 1 414 655 B1 cited above.

Advantageously, it is the first bead that is designed to be placed towards the outside of a vehicle. When such tyres are fitted to a vehicle, the asymmetry of the tyres tends to spread the crowns towards the outside of the vehicle; this has the advantage of improving the visual impression given by the tyre and wheel assembly but also of increasing the tyre track of the vehicle. The tyre track means the distance separating the two mid-planes of the crown of the two tyres on one and the same axle. The increase in track that can be obtained can easily reach 10 mm and even 15 mm.

In a particular application, the first bead has a diameter $\Phi_1$ and the second bead has a diameter $\Phi_2$ such that: $\Phi_1 \succ \Phi_2$. The difference in diameters between the first and the second beads can be 20 mm.

When such a tyre has been vulcanized in a usual mould and is mounted on its working rim and inflated substantially to its nominal pressure, an axial offset of the whole crown of the tyre to the bead of smallest diameter is noted. This offset is notably associated with the fact that the resultant in the axial direction of the forces due to the internal inflation pressure is not zero because of the different geometries of the two sidewalls of the tyre.

BRIEF DESCRIPTION OF THE DRAWINGS

Other features and advantages of the invention will emerge from the description given below with reference to the appended drawings which show, as non-limiting examples, embodiments of the subject of the invention.

DETAILED DESCRIPTION OF EMBODIMENTS OF THE INVENTION

The meridian or axial plane means any plane passing through the rotation axis A of the wheel and of the rim; axially inwards means a direction aimed towards the inside of the rim and axially outwards means a direction towards the outside of the rim.

Figure 1:
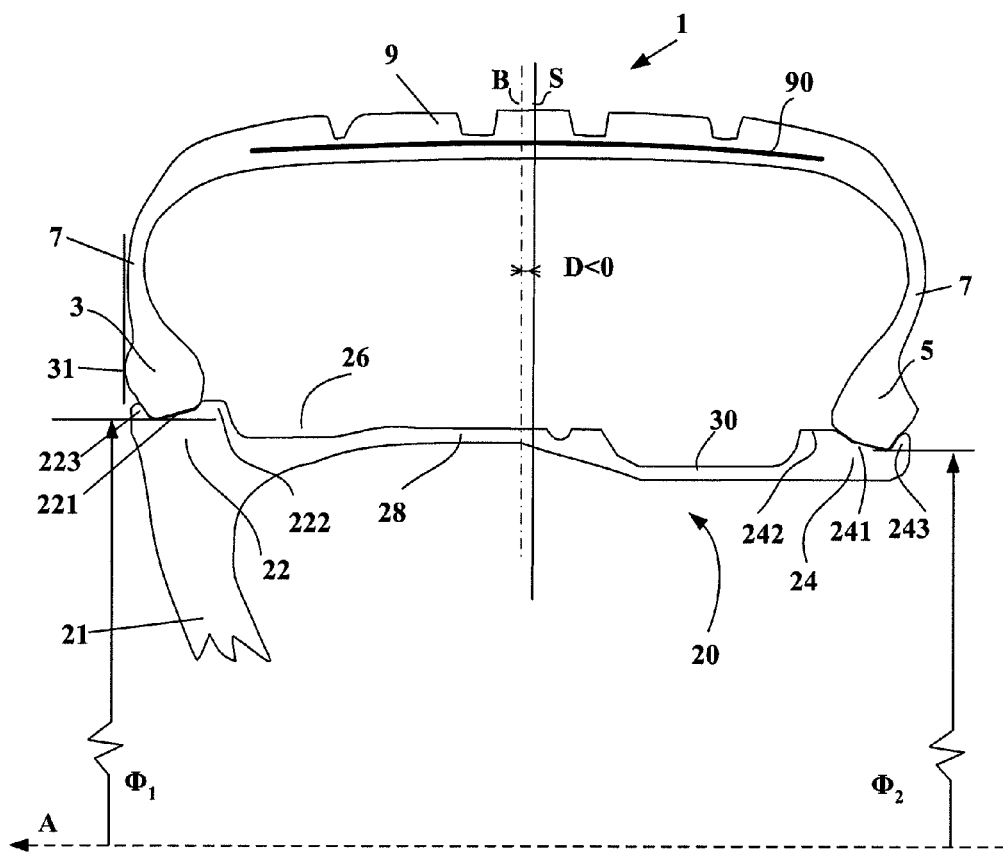
FIG. 1 shows a view in partial meridian section of a usual tyre mounted on its working rim and inflated substantially to its nominal pressure.

FIG. 1 shows, in partial meridian or axial section, a tyre 1 mounted on its working rim 20, inflated substantially to its nominal working pressure and not squashed. The rim 20 forms with a disc 21 a one-piece wheel. The disc may also be manufactured independently from the rim and joined to it subsequently. The rim 20 comprises a first seat 22 and a second seat 24 designed to serve as a bearing surface to the first bead 3 and second bead 5 of the tyre 1.

The first seat 22 comprises a frustoconical bottom 221 indistinguishable locally from a cone of revolution coaxial with the rim and open in the direction of the second seat 24, a safety boss 222 extending the bottom 221 of the first seat 22 towards the second seat 24, and an outer edge 223 extending the bottom 221 of the first seat on the side opposite to the second seat 24.

The second seat 24 comprises a frustoconical bottom 241 indistinguishable locally from a cone of revolution coaxial with the rim and open towards the first seat 22, a safety boss 242 extending the bottom 241 of the second seat 24 towards the first seat 22 and an outer edge 243 extending the bottom 241 of the second seat on the side opposite to the first seat 22.

The maximum diameter of the second seat is smaller than that of the first seat. In the example shown, the order of magnitude of the difference between the maximum diameters is of the order to 20 mm. The difference between the minimum radii of the two seats is therefore of the order of 10 mm.

From the first seat 22 to the second seat 24, there is successively a circumferential groove 26, a bearing surface 28 and a second circumferential groove 30. The first circumferential groove 26 serves as a mounting groove for the first seat 22. The outer diameter of the bearing surface 28 corresponds substantially to the maximum diameter of the second seat 24 in order to make it possible to fit a support (not shown) onto this bearing surface 28 while passing over the second seat 24.

The rim 20 shown is a preferred rim, but any other rim with equal or unequal seat diameters applies to the tyres according to the invention, irrespective of the geometry of the rim seats.

The tyre 1 comprises two beads 3 and 5 resting on the seats 22 and 24 of the rim 20, two sidewalls 7 and a crown 9. Each bead comprises annular reinforcements that are oriented substantially circumferentially and are practically inextensible. These reinforcements, such as bead wires, are designed in service to hold the beads on the rim seats. The first bead 3 has a (minimum) diameter $\Phi_1$ greater the diameter $\Phi_2$ of the second bead 5. The bead 3 rests on the seat 22 of the rim 20 placed on the side of assembly of the disc 21. In the example shown, it is the side designed to be placed towards the outside of a vehicle.

In FIG. 1, it is possible to define the mid-planes—S being the mid-plane of the crown and B being the mid-plane of the beads mounted on their working rim (or mid-plane of the seats of the rim 20). The mid-plane S is defined as being the plane perpendicular to the axis A and equidistant from the ends of the reinforcing plies 90 of the crown 9. It can be seen that the mid-plane S of the crown 9 is offset axially towards the second bead 5 by a distance D relative to the mid-plane B of the beads; the distance D is in this instance negative when taking as the positive side of the axis A the side directed towards the outside of the rim 20.

This axial offset towards the side of the rim designed to be placed towards the inside of the vehicle (or the inside of the rim) is due to the fact that the two sidewalls 7 have different lengths and geometries because of the difference in diameters between the two beads 3 and 5. The result of the forces associated with the inflation pressure in the axial direction is not substantially zero as usual for tyres of which the two beads have the same diameter, but is directed towards the side of the highest sidewall, in this instance the inside of the rim.

It can be seen in FIG. 1 that consequently the proportion that is axially furthest to the outside of the assembly of the tyre 1 and rim 20 consists of the end of the bead 3 marked 31. The result of this is that, when there is a pavement impact or pavement scuffing, for example, this portion of the bead is very exposed to damage.

Figure 2:
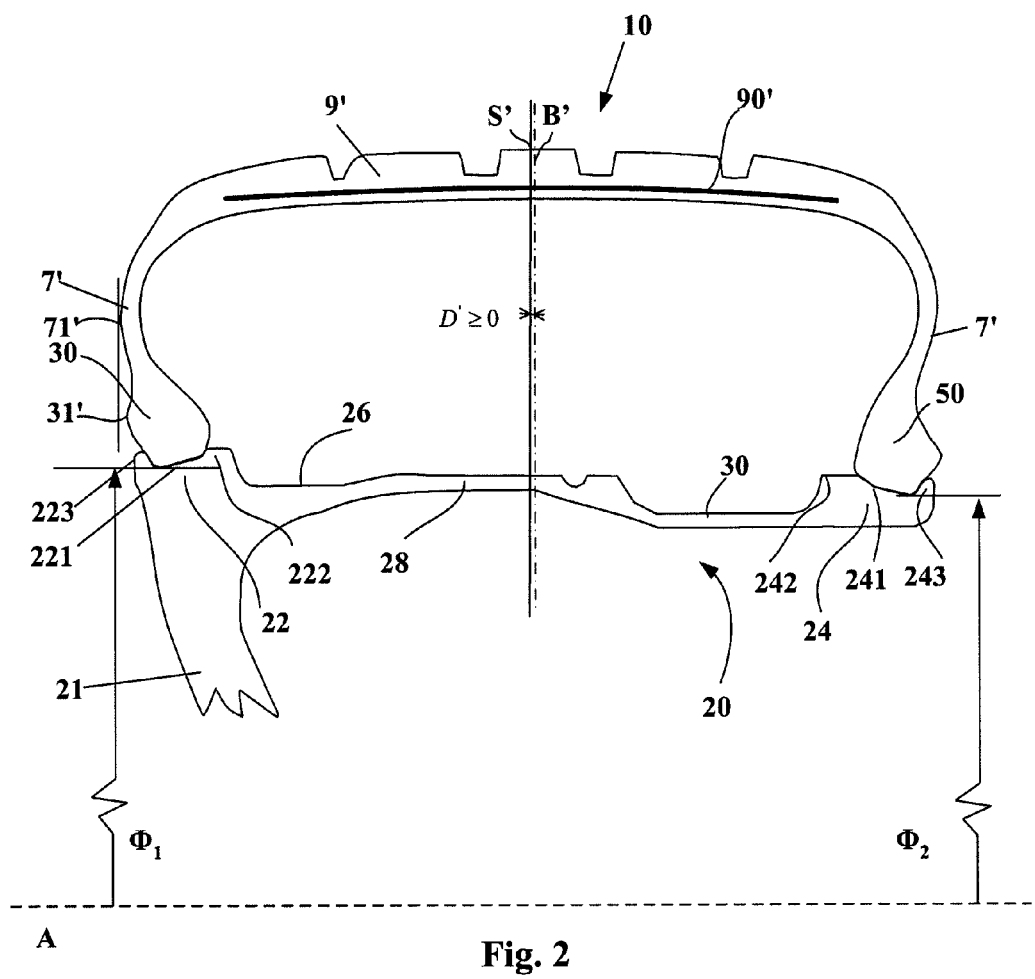
FIG. 2 shows, in a view similar to FIG. 1, a second tyre according to the invention.

FIG. 2 shows a tyre 10 according to the invention mounted on its working rim 20, inflated substantially to its nominal pressure and not squashed. This tyre comprises two beads 30 and 50 resting on the seats 22 and 24 of the rim 20, two sidewalls 7' and a crown 9'. The mid-plane of the beads is marked B' and the mid-plane of the crown S'. It can be seen that, for this tyre, the plane S' is offset axially towards the first bead 30 by a positive distance D'.

Consequently, the point placed axially furthest towards the outside of the assembly of the tyre 10 and rim 20 is no longer the end of the bead 31' but a portion of the sidewall marked 71. This strengthens the resistance of the tyre 10 to the impacts and accidents that it is likely to encounter in service while reducing the exposure of the bead 3'. It also has the advantage of positively modifying the visual appearance of the tyre mounted on its working rim 20.

In what follows, the angles are defined for each bead taking as reference an axis Ox (respectively Ox') parallel to the rotation axis A, taking as the direction the direction axially outwards. The angles are counted as positive when they extend radially towards the outside of the tyre.

Figure 3:
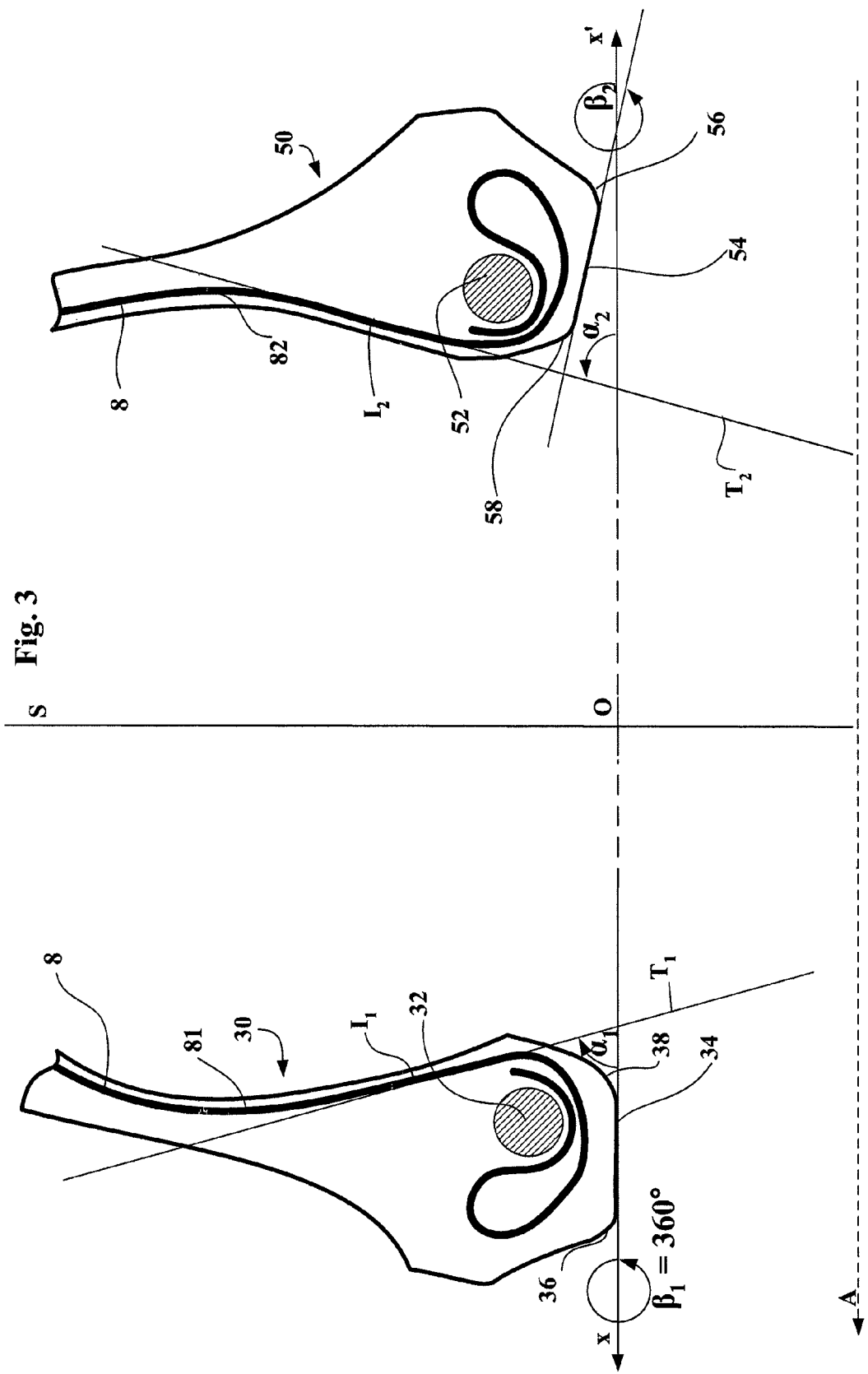
FIG. 3 shows in partial meridian section a view of the moulding profile of the two beads of the tyre of FIG. 2.

FIG. 3 illustrates a first embodiment of the tyre according to the invention. FIG. 3 shows the profile of the outer bead 30 and of the inner bead 50 of the tyre 10 when they are moulded in their curing mould (not shown).

The bead 30 comprises a portion 81 of the carcass reinforcement 8, a seat 34 placed between a point 36 axially on the outside and a heel 38 axially on the inside and an annular inextensible reinforcement 32. The portion 81 of the carcass reinforcement is wound around the annular reinforcement 32 going from the heel 38 to the point 36 and then making a loop axially towards the inside in order to achieve its anchoring. The bead seat 34 has, in the moulding position, a generatrix that is inclined towards the outside at an angle $\beta_1=360°=0°$. The angles are defined to within $2\pi$.

The bead 50 comprises a portion 82 of the carcass reinforcement 8, a seat 54 placed between a point 56 axially on the outside and a heel 58 axially on the inside and an annular inextensible reinforcement 52. The portion 82 of the carcass reinforcement is wound round the annular reinforcement 52 going from the heel 58 to the point 56 and then making a loop axially towards the inside in order to achieve its anchoring. The bead seat 54 has a generatrix inclined towards the outside at an angle $\beta_2$.

Taking account of the chosen mark, the angle $\beta_2$ is equal to 355 degrees or else to −5 degrees.

The geometry of the bead 30 in its vulcanizing mould differs mainly from that of the bead 50 in that the seat 34 of the bead 30 has a generatrix that is substantially parallel to the rotation axis Ox of the tyre. The angle $\beta_1$ is in this instance equal to 360 degrees or else to zero degrees.

The whole bead 30 is placed substantially in the same place in the mould as in the case of the tyre 1, but the bead exhibits a rotation through an angle substantially equal to $-\beta_2$, or in this instance 5°. When the tyre 10 produced according to this embodiment is mounted on its working rim, the angle of inclination taken by the portion of carcass reinforcement reduces because of this angular rotation $\beta_2=-5$ degrees of the seat of the bead in order to adapt to the angle of inclination of the rim seat 22.

The result of this is that, in the mounted and inflated state, the two portions of carcass reinforcement 81 and 82 have a dissymmetry of inclination which is substantial and which corresponds to the profile of the tyre shown in FIG. 2.

The portions of carcass reinforcement 81 and 82 in the area with beads close to the sidewalls, have a change of curvature and a point of inflection respectively $I_1$ and $I_2$. The tangent $T_1$ to the portion 81 at the point of inflection $I_1$ crosses the axis Ox, parallel to the rotation axis A of the rim with an angle of inclination $\alpha_1$. Similarly, $T_2$ makes an angle $\alpha_2$ with the axis Ox', parallel to A.

$\alpha_1$ and $\alpha_2$ both have a positive value of less than 90 degrees. In the example of FIG. 3, $\alpha_1$ and $\alpha_2$ are substantially equal. These angles correspond to the values of inclination of the portions of a carcass ply at their point of inflection in the bead relative to the rotation axis A of the tyre 1 in the mould.

It should be noted that, when they are vulcanized in the mould, the two beads have an identical geometry in the whole of their radially lower portion, namely the portions of the beads placed radially at the level of the annular reinforcement and beneath.

In the case of the preferred mould for the tyre 10, substantially the same moulding geometry is retained for the crown and the portions of the sidewalls adjacent to the crown.

Figure 4:
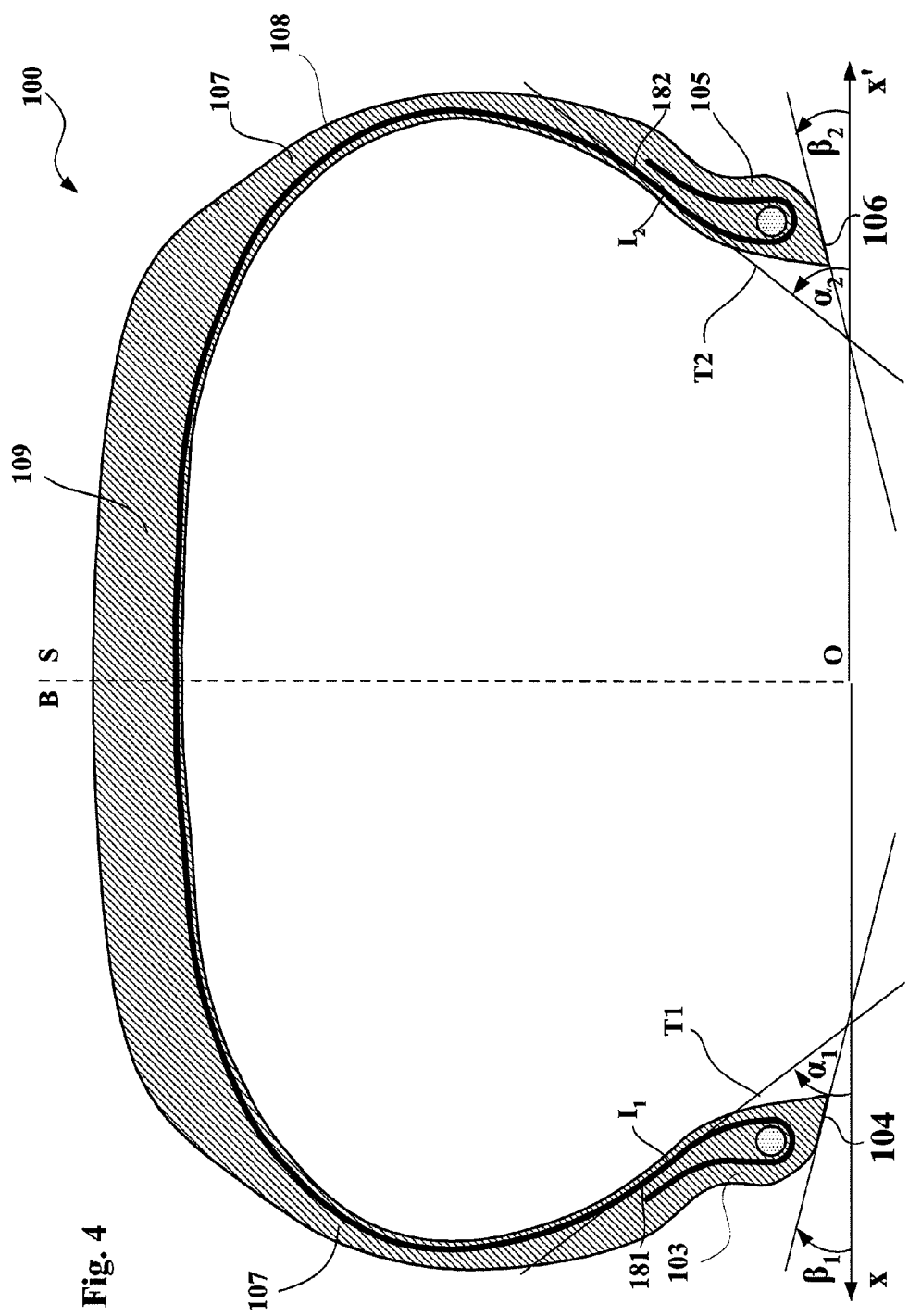
FIG. 4 shows in partial meridian section a view of the moulding profile of a second type of usual tyre for a passenger vehicle.

Illustrated in FIG. 4, seen in partial meridian or axial section, is the moulding profile of a second type of tyre that is usual for passenger vehicles. The vulcanizing mould is not shown. This tyre 100 comprises two beads 103 and 105, two sidewalls 107 and a crown 109. The two beads have a seat 104, respectively 106, designed to rest on a rim seat not shown. The seats 104 and 106 have an angle of inclination $\beta_1$ and $\beta_2$ that is symmetrical and equal to 5°. Each bead comprises a portion 181 and 182 of the carcass reinforcement 108. As above, each portion has, in the bead 103 or 105 or the adjacent sidewall 107, a point of inflection $I_1$ and $I_2$. The tangents to the portions of carcass reinforcement T1 and T2 have an inclination that is symmetrical relative to the axes Ox and Ox' at angles $\alpha_1$ and $\alpha_2$. The mid-planes of the crown S and of the beads B are indistinguishable. This tyre is not an asymmetric tyre within the meaning of the present application.

Figure 5:
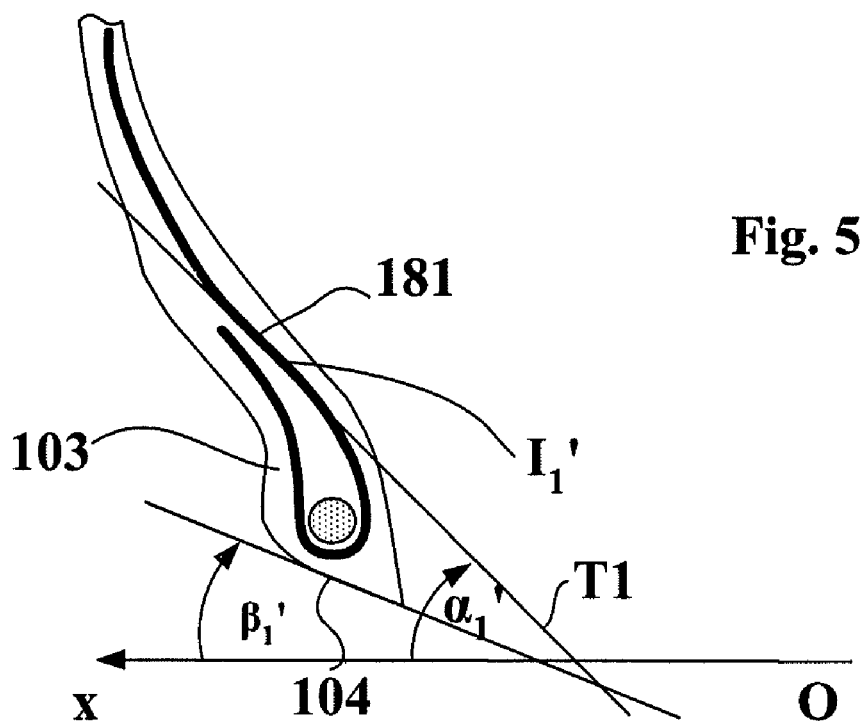
FIG. 5 shows in partial meridian section a view of the moulding profile of a first bead of an asymmetric tyre similar to that of FIG. 4 according to a first embodiment.

FIG. 5 shows, in partial meridian view, the moulding profile of the bead 103 in order to obtain an asymmetrical tyre.

The moulding profile of the bead 103 illustrated in FIG. 5 is characterized in that the angle of inclination of the seat 104 $\beta'_1$ is greater than $\beta_1$. As in the preceding example, the amplitude of the difference between $\beta_1'$ and $\beta_1$ or $\beta_2$ is greater than 3° and can be greater than 10° depending on the asymmetry that is sought. In this first example, $\alpha_1'=\alpha_1$. The moulding is therefore carried out only with a rotation of the moulding element of the seat 104.

Figure 6:
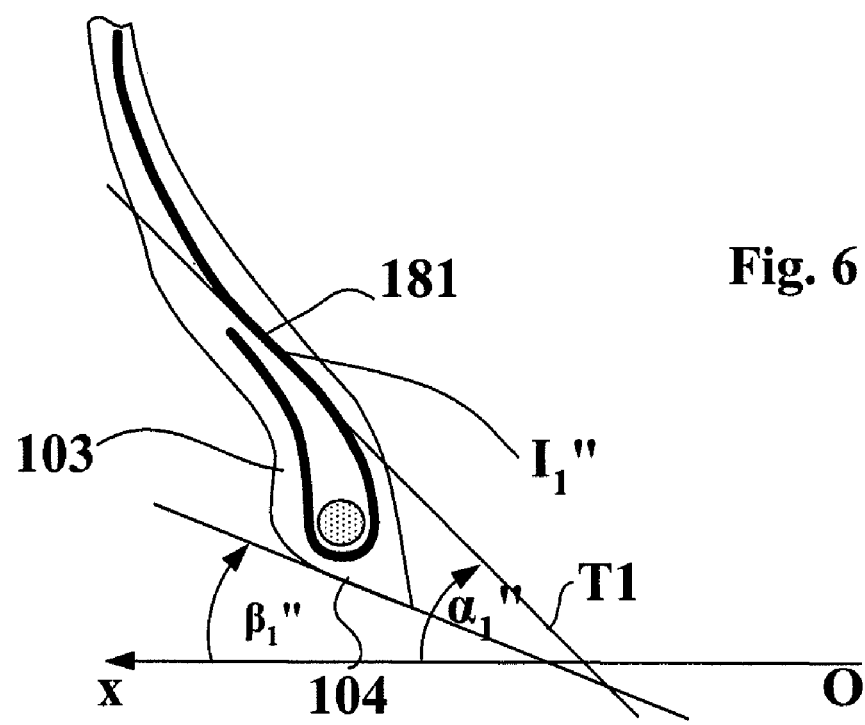
FIG. 6 shows in partial meridian section a view of the moulding profile of a first bead of an asymmetric tyre similar to that of FIG. 4 according to a second embodiment.

FIG. 6 shows, in partial meridian view, the moulding profile of the bead 103 in order to obtain an asymmetrical tyre according to a second embodiment.

The moulding profile of the bead 103 illustrated in FIG. 6 is characterized in that $\beta_1''=\beta_1'\succ\beta_1$, and $\alpha_1''\prec\alpha_1'=\alpha_1$.

The moulding of the bead 103 is therefore carried out with a combination of a rotation of the seat 104 in order to increase the inclination of this seat during moulding, and a translation of the moulding elements of the bead to the mid-plane of the crown S. It is this translation that increases the angle of inclination of the tangent T1 of the carcass reinforcement at the point of inflection $I_1$ and therefore enhances the asymmetry of the vulcanized tyre 100.

The amplitude of this asymmetry is therefore dependent on the amplitudes of rotation and of translation of the moulding element(s) of the bead seat during the moulding of the unvulcanized tyre.

Tests have been run with the following tyres similar to the first type of tyre described:
  A: 235-660R480, control;
  B: 235-660R480, translation of the first bead towards the second when moulding;
  C: 215-630R440, translation of the first bead towards the second when moulding;
  D: 295-740R560, translation of the first bead towards the second when moulding; and
  E: 295-740R560, rotation of the bead seat when moulding.
The following table shows the results obtained:

| Test | $\alpha_1 - \alpha_2$ in mould (degrees) | $\beta_1 - \beta_2$ in mould (degrees) | $\alpha_1 - \alpha_2$ mounted-inflated (degrees) | D Axial offset mounted-inflated (mm) |
| --- | --- | --- | --- | --- |
| A (control) | −4 | 0 | +4 | −5 |
| B | −31 | 0 | −17 | 1 |
| C | −18 | 0 | −10 | −0.6 |
| D | −21 | 0 | −13 | −0.1 |
| E | 0 | +15 | 0 | −0.1 |

The control A was vulcanized in a mould with a slight difference of inclination of −4 degrees of the two carcass reinforcement portions and the two beads in the same position as mounted on their working rim. The resulting tyre, mounted and inflated to its working pressure, has an angle of inclination of the two carcass reinforcement portions of +4 degrees, which is a variation of 8 degrees, and an axial offset of −5 mm.

This means that the offset occurred towards the inside of the vehicle, or towards the bead of smallest diameter. This is the example of the tyre 1 of FIG. 1.

The tyre B was vulcanized in a mould with a substantial difference of inclination $\alpha_1-\alpha_2$ of −31 degrees and the two beads in the same position as mounted on their working rim. The result of this in the mounted and inflated state is a difference of inclination of the two carcass reinforcement portions of −17 degrees and a positive axial offset of 1 mm. The axial offset of the control tyre is therefore completely reduced to below zero since it is 1 mm positive. This example corresponds to the tyre 10 illustrated in FIG. 2.

The tyre C was vulcanized like the tyre B according to the first production method with a smaller difference of inclination $\alpha_1-\alpha_2$ (−18 degrees) and the two beads in the same position as mounted on their working rim. The result of this in the mounted and inflated state is a difference of inclination of the two carcass reinforcement portions of −10 degrees and a negative axial offset of −0.6 mm.

The tyre D was vulcanized like the tyres B and C with an intermediate to slight difference of inclination $\alpha_1-\alpha_2$ (−21 degrees) and the two beads in the same position as mounted on their working rim. The result of this in the mounted and inflated state is a difference of inclination of the two carcass reinforcement portions of −13 degrees and a negative axial offset of −0.1 mm, or substantially equal to zero.

The tyre E was vulcanized with a rotation of the outer bead of +15 degrees. The two carcass reinforcement portions had the same angle of inclination relative to the rotation axis. The result of this in the mounted and inflated state is a return to a difference of inclination of the two carcass reinforcement portions of 9 degrees and a practically zero axial offset as in the case of the tyre D.

These last two tests indicate that the rotation of the bead seat and the translation of one of the beads towards the other during moulding make it possible to obtain dissymmetrical tyres with respect to their inclinations of carcass reinforcements in the two beads and with a zero or even positive axial offset despite differences in diameters of the two beads of the order of 20 mm.

The invention is not limited to the examples described and shown and various modifications may be made thereto without departing from the context defined by the appended claims.

The invention claimed is:

1. A method for manufacturing a tyre, comprising steps of:
    assembling an unvulcanized tyre, the tyre including a crown, a first sidewall and a first bead, a second sidewall and a second bead, and a carcass reinforcement, each bead including a seat; and
    vulcanizing the unvulcanized tyre in a mould having an asymmetric configuration in order to obtain a vulcanized tyre,
    wherein the mould is such that, when the tyre is placed in the mould, in any meridian section, the seat of the first bead has an angle $\beta_1$ with a rotation axis A and the seat of the second bead has an angle $\beta_2$ with the rotation axis a, such that:

$\beta_1-\beta_2 \succ 3$, the angles $\beta_1$ and $\beta_2$ being expressed in degrees, the angles $\beta_1$ and $\beta_2$ being defined, for each bead, relative to an axis Ox and Ox' parallel to the rotation axis A oriented positively towards outside of the tyre, and the angles $\beta_1$ and $\beta_2$ being positive when extending radially outwards, and
    wherein, when the tyre is placed in the mould, in any meridian section, the carcass reinforcement has a first point of inflection located at the first sidewall or at the first bead and a second point of inflection located at the second sidewall or at the second bead, and tangents (T1, T2) at the points of inflection of the carcass reinforcement make angles $\alpha_1$ and $\alpha_2$ with the rotation axis A such that: $\alpha_1-\alpha_2 \prec 0$.

2. A method according to claim 1, wherein $\beta_1-\beta_2 \succ 10$.

3. A method according to one of claims 1 and 2, wherein, when the tyre is placed in the mould, in any meridian section, the carcass reinforcement has a first point of inflection located at the first sidewall or at the first bead and a second point of inflection located at the second sidewall or at the second bead, and tangents (T1, T2) at the points of inflection of the carcass reinforcement make substantially identical angles $\alpha_1$ and $\alpha_2$ with the rotation axis A.

4. A method according to claim 1, wherein $\alpha_1-\alpha_2 \prec 10$.

5. A method according to claim 1, wherein $-35 \prec \alpha_1-\alpha_2 \prec -10$.

6. A method according to claim 1, wherein the crown and portions of the sidewalls adjacent to the crown of the tyre are placed symmetrically relative to a mid-plane of the crown of the tyre in the mould.

7. A method according to claim 1, wherein the first bead is designed to be located towards outside of a vehicle.

8. A method according to claim 1, wherein the first and second sidewalls include reinforcing inserts that support a load in an event of loss of inflation pressure.

9. A method according to claim 1, wherein the first bead has a diameter $\Phi_1$ and the second bead has a diameter $\Phi_2$, such that: $\Phi_1 \succ \Phi_2$.

10. A method according to claim 9, wherein a difference in diameters between the first and the second beads is 20 mm.

* * * * *